US009723001B2

(12) United States Patent
Moshfeghi

(10) Patent No.: US 9,723,001 B2
(45) Date of Patent: *Aug. 1, 2017

(54) METHOD AND SYSTEM FOR STATE MACHINE SECURITY DEVICE

(71) Applicant: Golba LLC

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,575

(22) Filed: Jun. 14, 2016

(65) Prior Publication Data

US 2016/0366133 A1 Dec. 15, 2016

Related U.S. Application Data

(63) Continuation of application No. 14/568,131, filed on Dec. 12, 2014, now Pat. No. 9,391,783, which is a
(Continued)

(51) Int. Cl.
*H04L 29/06* (2006.01)
*H04L 9/32* (2006.01)
(Continued)

(52) U.S. Cl.
CPC .......... *H04L 63/0876* (2013.01); *H04L 9/065* (2013.01); *H04L 9/0625* (2013.01);
(Continued)

(58) Field of Classification Search
None
See application file for complete search history.

(56) References Cited

U.S. PATENT DOCUMENTS 6,748,532 B1  6/2004  Digiorgio et al.
7,207,061 B2 * 4/2007  Martin .................. H04L 63/029
                                                                    726/11
(Continued)

FOREIGN PATENT DOCUMENTS

DE   WO 2012005739 A1 *  1/2012 ............. H04L 63/08

OTHER PUBLICATIONS

Portions of prosecution history of U.S. Appl. No. 13/681,667, Nov. 28, 2014, Moshfeghi, Mehran.
(Continued)

*Primary Examiner* — Harunur Rashid
*Assistant Examiner* — Wayne An
(74) *Attorney, Agent, or Firm* — Adeli LLP

(57) ABSTRACT

A security device may be utilized to provide security measures to an electronic device that may incorporate the security device or be coupled to it. The security measures may comprise authentication (e.g., authentication of devices, users, or activities), and/or encryption measures (e.g., encrypting or decrypting exchanged data). A transaction or access via the security device may be authenticated by communicating an authentication request by the security device to an authentication server, which may generate, in response, a sequence of information requests that are sent to the security device. The security device may then generate, in response, a sequence of responses that are sent to the authentication server, with the sequence of responses comprising a sequence of reported values each of which are unique. The authentication server may then authenticate the security device based on comparing of the sequence of reported values with a sequence of expected values that identifies the security device.

20 Claims, 7 Drawing Sheets

Related U.S. Application Data continuation of application No. 13/681,667, filed on Nov. 20, 2012, now Pat. No. 8,924,713.

(60) Provisional application No. 61/617,841, filed on Mar. 30, 2012.

(51) Int. Cl.
  *H04L 9/06* (2006.01)
  *H04L 9/08* (2006.01)

(52) U.S. Cl.
  CPC .......... *H04L 9/0631* (2013.01); *H04L 9/0643* (2013.01); *H04L 9/0825* (2013.01); *H04L 9/3271* (2013.01); *H04L 9/3273* (2013.01); *H04L 63/08* (2013.01)

(56) References Cited

U.S. PATENT DOCUMENTS

| | | | |
|---|---|---|---|
| 7,496,952 B2 * | 2/2009 | Edwards, Jr. .......... | G06F 21/31 707/999.001 |
| 7,660,880 B2 | 2/2010 | Ting et al. | |
| 7,690,025 B2 | 3/2010 | Grewal et al. | |
| 7,761,911 B2 | 7/2010 | Song | |
| 7,788,700 B1 | 8/2010 | Feezel et al. | |
| 7,961,873 B2 | 6/2011 | Ibrahim | |
| 8,689,353 B2 | 4/2014 | Bünter | |
| 8,717,401 B1 | 5/2014 | Gossweiler, III et al. | |
| 8,887,307 B2 | 11/2014 | Chen | |
| 8,914,851 B2 | 12/2014 | Fakhrai et al. | |
| 8,924,713 B2 | 12/2014 | Moshfeghi | |
| 8,925,056 B2 | 12/2014 | Nikankin | |
| 9,218,480 B2 | 12/2015 | Fakhrai et al. | |
| 9,391,783 B2 | 7/2016 | Moshfeghi | |
| 2005/0152543 A1 | 7/2005 | Shima et al. | |
| 2005/0163549 A1 | 7/2005 | Shima et al. | |
| 2005/0262026 A1 | 11/2005 | Watkins | |
| 2008/0066168 A1 | 3/2008 | Gregg et al. | |
| 2008/0289019 A1 | 11/2008 | Lam | |
| 2009/0064291 A1 | 3/2009 | Wahl | |
| 2009/0100530 A1 | 4/2009 | Chen | |
| 2009/0282096 A1 * | 11/2009 | Kamrowski ............. | H04L 67/16 709/203 |
| 2010/0031023 A1 * | 2/2010 | Dodd .................. | H04L 63/0428 713/155 |
| 2010/0050251 A1 | 2/2010 | Speyer et al. | |
| 2010/0122314 A1 | 5/2010 | Zhang et al. | |
| 2010/0153672 A1 * | 6/2010 | Jogand-Coulomb | G06F 13/4243 711/164 |
| 2010/0235623 A1 | 9/2010 | Simpson et al. | |
| 2010/0274859 A1 | 10/2010 | Bucuk | |
| 2011/0047628 A1 | 2/2011 | Viars | |
| 2015/0012936 A1 | 1/2015 | Chen | |
| 2016/0226864 A1 | 8/2016 | Fakhrai et al. | |

OTHER PUBLICATIONS

Portions of prosecution history of U.S. Appl. No. 14/568,131, Jun. 15, 2016, Moshfeghi, Mehran.

* cited by examiner

METHOD AND SYSTEM FOR STATE MACHINE SECURITY DEVICE

CLAIM OF PRIORITY

This patent application is a continuation application of U.S. patent application Ser. No. 14/568,131, filed Dec. 12, 2014, published as U.S. Patent Publication 2015-0172065. U.S. patent application Ser. No. 14/568,131 is a continuation application of U.S. patent application Ser. No. 13/681,667, filed Nov. 20, 2012, issued as U.S. Pat. No. 8,924,713. U.S. patent application Ser. No. 13/681,667, claims priority to and claims benefit from U.S. Provisional Patent Application Ser. No. 61/617,841 filed on Mar. 30, 2012. U.S. patent application Ser. No. 14/568,131, published as U.S. Patent Publication 2015-0172065, U.S. patent application Ser. No. 13/681,667, issued as U.S. Pat. No. 8,924,713, and U.S. Provisional Patent Application 61/617,841 are incorporated herein by reference.

The above stated application is hereby incorporated herein by reference in its entirety

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and a system for state machine security device.

BACKGROUND OF THE INVENTION

Various measures may be used to provide security in electronic devices. For example, security measures may comprise authenticating devices, users, and/or activities or actions. Security measures may also comprise securing communications of data to and/or from the electronic devices. In this regard, securing data communications may comprise use of standardized encryption algorithms to protect communicated data. Current encryption protocols and/or algorithms comprise various types and classes, different approaches to facilitate the data security. Some encryption and/or ciphering algorithms may comprise hash functions, such as the SHA-based algorithms. Another class of encryption algorithms is symmetric-key algorithms, in which communication peers use the same key during encryption and decryption operations. The keys used in symmetric-key operations may be preconfigured into the devices, or it may be generated using methods, which ensure that the keys match. Symmetric-key algorithms include block cipher algorithms, such as the Data Encryption Standard (DES) based algorithm(s) and Advanced Encryption Standard (AES) based algorithm(s), and stream cipher algorithms, such as RC4. Another type of encryption algorithms is public-key based algorithms, such as the RSA algorithm. Public-key algorithms incorporate asymmetric-key design, in which two separate keys, one of which is public and the other is private, are typically used. The keys are mathematically linked, which enables them to be utilized for data encryption and decryption. In this regard, the data is encrypted using one key while the data decryption is performed using the other key. For example, in RSA based operations data is encrypted using a public key which is known by all recipients, whereas decryption requires, in addition to the public key, a private key specific to, e.g., each server (i.e., known only to the server) and used particularly for decryption by that server.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for state machine security device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
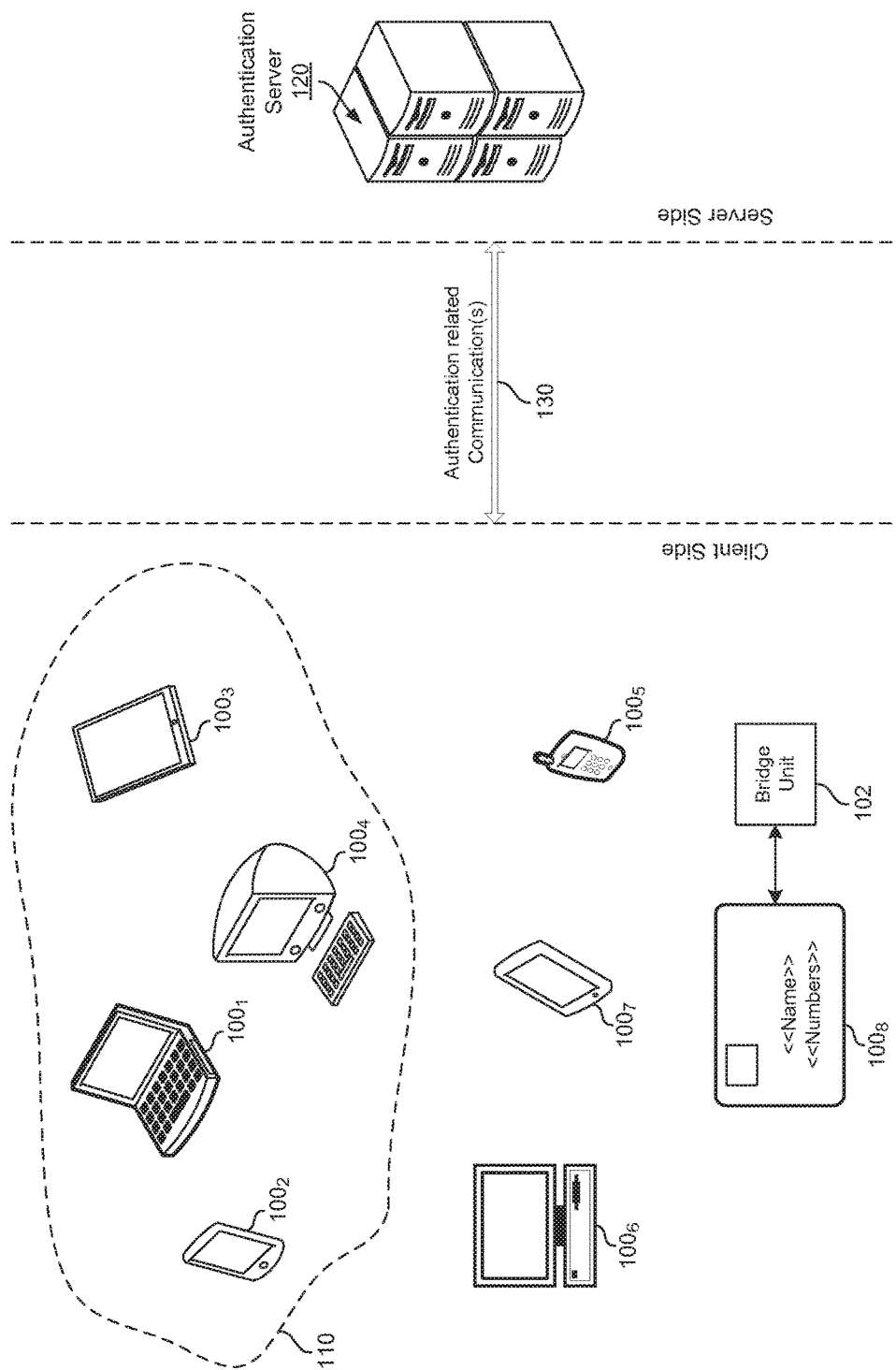
FIG. 1 is a block diagram illustrating an exemplary communication setup that may incorporate selective use of dynamic security devices, in accordance with an embodiment of the invention.

Certain embodiments of the invention may be found in a method and system for a state machine security device. In various embodiments of the invention, a security device may be utilized to provide security measures to an electronic device that may incorporate or be coupled to the security device. The security measures may comprise authentication measures (e.g., authentication of devices, users, or activities), and/or encryption/decryption measures (e.g., encrypting or decrypting exchanged data). For example, authenticating a transaction or access via the security device may comprise communicating an authentication request by the security device to an authentication server. In response to the authentication request, the authentication server may generate a sequence of information requests that are sent to the security device. In response to the sequences of information requests received from the authentication server, the security device may generate a sequence of responses that are sent to the authentication server, wherein the sequence of responses comprise a sequence of reported values with each reported value being unique in each one of the sequence of response. In this regard, in some instances, two or more consecutive values in a sequence may be the same; nonetheless, uniqueness may be maintained as long as the sequence as a whole—i.e., the sequence is unique as compared to sequences reported by all other devices. The security device may be authenticated by the authentication server based on comparing the sequence of reported values with a sequence of expected values used by the authentication server in identifying the security device.

The security device may generate the sequence of responses based on an internal authentication state machine in the security device. In this regard, each reported value in each of the sequence of responses may be set based on a particular state in the internal authentication state machine during the generation of the sequence of responses. The security device may be configured to traverse the internal authentication state machine in particular manner, such as in single state increments, at least once during the generation of the sequence of responses. In other instances, however, states may be traversed in other manner beside in single state increments, and/or without having to traverse each state in the internal authentication state machine. For example, in some embodiments, the trajectory of state transitions may be a configurable path using single state increments and/or a variable number of state increments, which may be programmed by the server. In some embodiments, the trajectory of state transitions may be configured such that only a subset of the states in the internal authentication state machine are traversed (and/or with the selected states being traversed once or more). The security device may be initialized, by the authentication server, for example, at the beginning of each authentication or some authentications to a particular state of the internal authentication state machine. A state mapping may be set (e.g., by the security device or the authentication server) to be used in generating the sequence of reported values based on the internal authentication state machine. In this regard, the setting of the state mapping may comprise setting or adjusting one or more of: number of states in the internal authentication state machine, a unique value associated with each state in the internal authentication state machine, a starting state in the internal authentication state machine. In some instances, the authentication server may reconfigure, at the end of each authentication or some authentications, the generation of the reported values by the security device and the sequence of expected values such that a subsequent authentication is validated by a different state mapping.

In some instances, messages communicated between the security device and the authentication server may be encrypted. In this regard, encrypting exchanges between the security device and the authentication server may comprise selecting by the security device, for the encryption of messages, a random private key associated, and communicating the selected random private key to the authentication server using public key encryption, the security device and the authentication device being configured to switch to use the selected random private key after the exchange of the random private key.

FIG. 1 is a block diagram illustrating an exemplary communication setup that may incorporate selective use of dynamic security devices, in accordance with an embodiment of the invention. Referring to FIG. 1, there is shown a plurality of electronic devices $100_1$-$100_8$, and an authentication server 120.

Each electronic device ($100_i$) may comprise suitable logic, circuitry, interfaces, and/or code for performing various operations or functions, and/or for running various applications, services, and/or programs. In this regard, operations, functions, applications, services, and/or programs available in or supported by the electronic device 100 may be performed, executed and/or run based on user instructions or interactions, and/or based on pre-configured instructions. In some instances, electronic devices may be operable to communicate via wired and/or wireless connections, in accordance with one or more supported wireless and/or wired protocols or standards Exemplary electronic devices may comprise laptop computers (e.g., device $100_1$), cellular phones (e.g., device $100_5$), tablets (e.g., device $100_3$), desktop computers (e.g., devices $100_4$ and $100_6$), smartphones (e.g., devices $100_2$ and $100_7$), and/or battery-less electronic devices, such as credit cards (e.g., device $100_8$) or other similar devices that may be used to perform particular transactional functions (e.g., transportation cards, etc.). The invention is not limited, however, to any particular type of electronic devices.

In some instances, electronic devices may comprise internal power supply components (e.g., batteries), which may supply necessary power when an external power supply (e.g., connection to external power sources, such as electrical outlets) may not be possible. In other instances, however, where the electronic devices may be battery-less, such as the credit card $100_8$, the electronic devices may obtain power (when needed) from external sources and/or may utilize external devices to perform functions or operations that may require power. In this regard, power may be provided to battery-less devices by direct contact or wirelessly, such as using near field communication (NFC) or Bluetooth. For example, a credit card (device $100_8$) may obtain power needed to perform particular functions (e.g., authentication) from an external bridge unit 102 (e.g., card reader), which may provide the power while linking the credit card for authentication thereof.

The authentication server 120 may comprise suitable logic, circuitry, interfaces, and/or code for authenticating security devices, tokens, or tags (e.g., credit card device, token with electronic medical record information, etc.), which may be used in providing and/or supporting security functions.

In operation, the electronic device $100_1$-$100_8$ may be used to run or execute various functions, programs and/or applications, such as based on pre-configured instructions, and/or real-time user instructions, actions or interactions. In some instances, the electronic devices $100_1$-$100_8$ may also be configured to perform (or require) wireless and/or wired communications, such as in response to user interactions therewith (e.g., browsing activities), and/or as in support of functions, programs and/or applications running on and/or executed by the electronic devices.

In an aspect of the invention, the electronic device $100_1$-$100_8$ may implement and/or utilize security measures. For example, security measures and/or procedures may be utilized to secure use of the electronic devices (e.g., during activities, functions, programs and/or applications performed therein), and/or in conjunction with communications of data from and/or to the electronic device (e.g., protecting data exchanged during peer-to-peer communication, to guard against unauthorized access of communicated data). In this regard, securing use of and/or communications by electronic devices may simply entail authenticating the devices, and/or transactions performed using the devices. In some instances, security operations may also relate or apply to user(s) utilizing the devices, and/or transactions performed using the devices. For example, security operations pertaining to electronic devices may comprise authenticating transactions (e.g., purchases using the credit card $100_8$), and/or authenticating the identity of users (e.g., by online retailers, during online transactions). In some instances, particular authentications may only be performed once. For example, a user may only be authenticated once, and after a device-user combination is authenticated, it may be accepted as valid and authorized thereafter.

In some instances, in addition to authentication related measures, other security measures may be utilized, such as encryption. In this regard, encryption and/or decryption protocols and/or algorithms may be utilized to protect and/or ensure validity of data, such as data exchanged during communications to and/or from the electronic devices, whereby exchanged data may be encrypted or ciphered by the sending device, with the receiving device (or system) needing to decrypt received encrypted data before accessing and/or using the data. Encryption may be performed in accordance with one or more encryption algorithms or protocols. Exemplary encryption or ciphering algorithms may comprise hash function based algorithms, such as the SHA algorithm(s); public-key algorithms, such as the RSA algorithm; and symmetric-key algorithms, which include block cipher algorithms, such as the Data Encryption Standard (DES) based algorithm(s) and Advanced Encryption Standard (AES) based algorithm(s), and stream cipher algorithms, such as RC4. For example, data communicated to and/or from the electronic devices $100_1$-$100_8$ may be encrypted using the RSA algorithm, which is a public-key algorithm—that is data is encrypted using a public key which is known by all recipients/devices. The decryption operation, on the other hand, requires, in addition to the public key, a matching private key specific to each server and used particularly for decryption by that server.

In an aspect of the invention, one or more of the electronic devices $100_1$-$100_8$ may comprise and/or may utilize dedicated components for supporting security operations performed or supported thereby, such as to enable and/or facilitate authentication, and/or data encryption and/or decryption. The electronic devices $100_1$-$100_8$ may incorporate and/or be coupled to, for example, security devices (including, for example, security tokens, tags, or the like), which may be utilized to authenticate the electronic devices, operations or functions which may be performed in the electronic devices, user(s), and/or particular activities (e.g., transactions conducted or initiated via the electronic devices). In an embodiment of the invention, use of the security devices may require or entail authenticating the security devices themselves, before and/or as part of providing security operations or functions to the electronic devices. In some instances, the security devices may be configured to use and/or support use of encryption algorithms or standards. In this regard, the security devices may be used to perform or support encryption/decryption operations required by the electronic devices (e.g., in encrypting/decrypting data exchanged by the electronic devices), and/or to only support encryption/decryption operations needed by the security devices themselves (e.g., while communicating with particular remote systems, such as the authentication server 120).

For example, the security devices may support use of the RSA algorithm, and to that end may generate and/or provide information that enable encryption of communicated messages, and/or decryption of received encrypted messages. In this regard, the information generated and/or provided by the security devices may comprise, for example, private keys that are used in conjunction with the known/comment public keys to enable decryption encrypted messages. In instances where the RSA algorithm is utilized, the security devices may generate private keys that may be used by corresponding electronic devices. These private keys may be regenerated, such as after particular intervals—i.e., generated private keys may remain valid only for certain time before a new private key is generated.

In some instances, the electronic devices $100_1$-$100_8$ may not always require security related functions (authentication, and/or encryption/decryption). In this regard, the electronic devices $100_1$-$100_8$ may only need security related functions when secure communications are necessary. For example, secure communication may not be required, for example, when electronic devices are located sufficiently close to each other to enable direct device-to-device connectivity, and such as when the electronic devices $100_1$-$100_4$ are collocated within a particular location or local network, shown as reference 110. In such instances, where direct device-to-device connectivity is done, the need for securing communication may be obviated and/or forgone (e.g., no encryption/decryption of data is performed).

In an embodiment of the invention, security devices used by electronic devices, such as some of the electronic devices $100_1$-$100_8$, may be utilized selectively and/or dynamically. In this regard, the selective and/or dynamic use of security devices may correlate and/or relate to the dynamic and/or non-constant use of encryption/decryption by the electronic devices $100_1$-$100_8$. For example, the selective use of security devices may comprise dynamically activating the security devices only when use of the security devices may be necessary, such as when engaging in secure communications. In this regard, in instances when the electronic devices are not engaged in secure communications, the corresponding security devices may be deactivated. The deactivating of the security device may lead to power saving as a result of the security device itself not running (i.e., power saving from the security device being non-functioning) and/or from non-use of other resources typically utilized during secure communication (e.g., processing resources used for data encryption/decryption). Accordingly, the security device may be activated only in instances when it is determined that use of the security device is needed, such as when the electronic device associated with the security device is about to engage in secure communication. For example, secure communications may be utilized when communicating with a peer device that is remote, thus requiring securing communication therebetween, and/or when accessing a secure website.

In an embodiment of the invention, the security device may be configured to concurrently and independently handle a plurality of security related functions, such as concurrent secure communications with peer remote devices and/or multiple access applications of secure website locations. In this regard, a single security device may operate in a mutually exclusive manner to prevent a particular remote peer or secure website from obtaining security information (e.g., RSA private key) that is utilized for another remote peer or secure website.

For example, the laptop $100_1$ may concurrently communicate, using secure communication links, with the smartphone $100_2$, while securely accessing a website being run or hosted by the computer $100_6$. Communications by the laptop $100_1$ may be secured using the RSA algorithm, which may necessitate use of the security device to generate private keys used in encrypting and/or decrypting communicated data. Accordingly, the security device utilized by the laptop $100_1$, in accordance with the present invention, may be operable to concurrently generate two different private keys, one for decrypting encrypted data received from the smartphone $100_7$ and the other for decrypting encrypted data received from the computer $100_6$. Furthermore, the security operations performed by the security device utilized by the laptop $100_1$ to support communication with each of the smartphone $100_2$ and the computer $100_6$ may be performed separately, and any information associated therewith may be maintained hidden from the other communication. For example, the generation of the private keys by the security device may be performed such that the security device may generate the private keys for both communications at the same time, but such that operations relating to encrypting/decrypting data for each communication session uses functions allocated for only that communication session, and obtains ("sees") only information relating to the corresponding communication session.

In an embodiment of the invention, the security devices may be integrated into and/or implemented within the electronic devices. In other words, the security device may be implemented as logical or physical component of the electronic device rather than being a separate, stand-alone device. In other instances, however, the security devices may be implemented as separate physical devices, which may be coupled or connected to the electronic devices, and used thereby in conjunction with security operations. In instances where the security device is integrated into another system (e.g., into the electronic devices), various functions or operations performed or needed by the security device (e.g., computations and storage) may be performed using the resources of the system, or performed on separate dedicated hardware (e.g., processor and/or memory) integrated into the security device itself. In some instances, a dedicated customized operating system (OS) may be run in the security device, and may only be used for handling operations, instructions, and data of the security device.

In some embodiments of the invention, a dedication server (e.g., the authentication server 120) may be utilized to provide centralized support of security operations. In this regard, the authentication server 120 may communicate with the electronic devices and/or the security devices (e.g., authentication related communications 130) to interrogate these devices with different data requests, and uses the received responses from the devices in authenticating the devices. In an embodiment of the invention, the authentication related interactions may be handled by security devices. In this regard, each security device may comprise a combination of logic and storage hardware (HW) to enable responding to the server interrogation. For example, the storage hardware may be implemented using Random Access Memory (RAM) elements, for storing data required for constructing the responses, and the logic hardware may comprise computational or processing units (e.g., adders, multipliers, microprocessors, etc.), which may enable constructing the responses and/or performing any required data manipulation, based on received and/or stored data for example. The combination of storage and logic hardware inside each security device may make that the device unique for authentication by the authentication server 120. In some embodiments and implementations of the invention, the authentication server 120 may be configured to set or modify some data and/or computing parameters inside the security devices for further security enhancement. These features and more are explained in more details in at least some of the following figures.

In an embodiment of the invention, a single security device may be used to handle multiple devices and/or applications (e.g., storing security related data pertaining to multiple accounts, such that the single security device may be used for authentication of the multiple accounts). For example, multiple credit card numbers (from different banks) may be integrated into a single security device. In some instances, each account authentication may then be performed by a separate logic inside the security device.

Figure 2A:
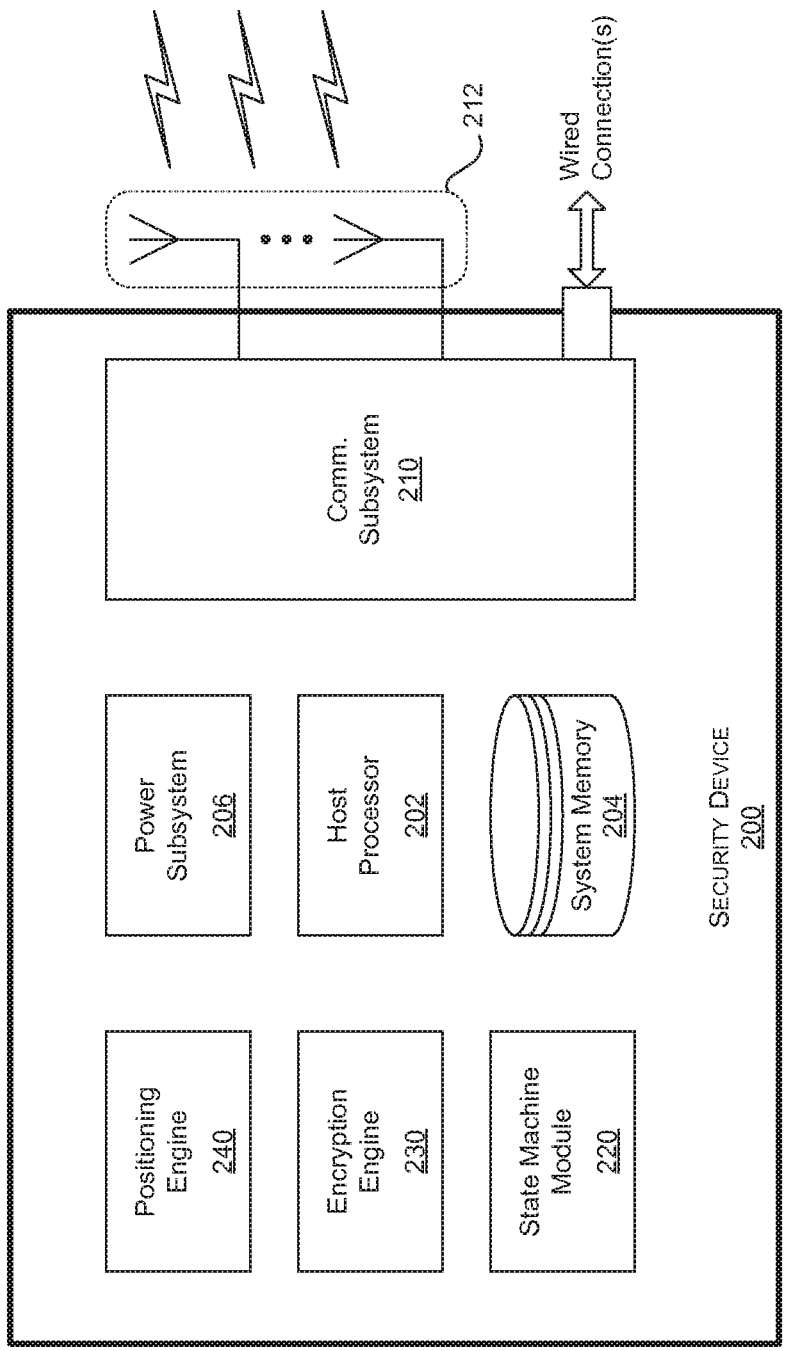
FIG. 2A is a block diagram illustrating an exemplary security device, in accordance with an embodiment of the invention.

FIG. 2A is a block diagram illustrating an exemplary security device, in accordance with an embodiment of the invention. Referring to FIG. 2 there is shown a security device 200.

The security device 200 may comprise suitable logic, circuitry, interfaces, and/or code that may be operable to support security operations in an electronic device (e.g., one of the electronic devices $100_i$ of FIG. 1). In this regard, the security device 200 may be operable to implement and/or support use of various security measures and/or procedures, such as to authenticate devices, users, or activities, and/or to protect data exchanged during secure communications. In this regard, the security device 200 may be configured to use or support use of one or more encryption algorithms that may be supported by the electronic device. For example, the security device 200 may be operable to generate and/or provide information that enable and/or facilitate decryption and/or encryption of data communicated to and/or from the electronic device. The security device 200 may be operable to, for example, generate and/or provide private keys used in conjunction with RSA based operations. The security device 200 may be integrated and/or implemented directly within the electronic device, as logical and/or physical components for example.

The security device 200 may comprise, for example, a host processor 202, a system memory 204, a communication subsystem 210, antennas 212, a state machine module 220, encryption engine 230, and positioning engine 240. Nonetheless, while these elements are shown as components and/or subsystems of the security device 200, in some instances, one or more of these elements (and/or other resources attributed to the security device 200) may be separate and may actually be elements or components of an electronic device containing or using the security device 200, but may still be utilized by and/or support operations of the security device 200 (i.e., may be treated as 'logical' components of the security device 200).

The host processor 202 may comprise suitable logic, circuitry, interfaces, and/or code that may be operable to process data, and/or control and/or manage operations of the security device 200, and/or tasks and/or applications performed therein. In this regard, the host processor 202 may be operable to configure and/or control operations of various components and/or subsystems of the security device 200, by utilizing, for example, one or more control signals. The host processor 202 may enable execution of applications, programs and/or code, which may be stored in the system memory 204, for example.

The system memory 204 may comprise suitable logic, circuitry, interfaces, and/or code that may enable permanent and/or non-permanent storage, buffering, and/or fetching of data, code and/or other information, which may be used, consumed, and/or processed in the security device 200. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The power subsystem 206 may comprise suitable logic, circuitry, interfaces, and/or code that may be operable to provide power required for functions or operations of the security device 200. The power subsystem 206 may comprise an internal power supply (e.g., a battery), or in instances where the security device 200 lacks an internal power supply, the power subsystem 206 may be operable to obtain power from external sources (e.g., through wireless connections, such as using NFC connectivity).

The communication subsystem 210 may comprise suitable circuitry, interfaces, logic, and/or code that may be operable to communicate data from and/or to the security device 200, such as via one or more wired and/or wireless connections (via antennas 212). The communication subsystem 210 may be configured to support one or more wired protocols and/or interfaces, and/or one or more wireless protocols and/or interfaces, facilitating transmission and/or reception of signals to and/or from the security device 200 and/or processing of transmitted or received signals in accordance with applicable wired or wireless protocols. Examples of wireless protocols or standards that may be supported and/or used by the communication subsystem 210 may comprise wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+ (e.g., GSM/GPRS/EDGE, and IS-95 or cdmaOne) and/or 3G/3G+ (e.g., CDMA2000, UMTS, and HSPA); 4G standards, such as WiMAX (IEEE 802.16) and LTE; Ultra-Wideband (UWB), and/or the like. Examples of wired protocols and/or interfaces that may be supported and/or used by the communication subsystem 210 may comprise Ethernet (IEEE 802.3), Fiber Distributed Data Interface (FDDI), and Integrated Services Digital Network (ISDN). Examples of signal processing operations that may be performed by the communication subsystem 210 may comprise, for example, filtering, amplification, analog-to-digital conversion and/or digital-to-analog conversion, up-conversion/down-conversion of baseband signals, encoding/decoding, encryption/decryption, and/or modulation/demodulation.

The state machine module 220 may comprise suitable logic, circuitry, interfaces, and/or code operable to implement and/or control operation of state machines. In this regard, the state machine module 220 may support a plurality of state machines, which may be used for controlling different aspects of the functions or operations of the security device 200. For example, the state machine module 220 may support use of 'activation' state machines, which may be used to control the state of the security device 200 itself (e.g., setting the security device 200 into one of a plurality of available states, such as 'running', 'sleep', 'standby', etc.), and/or 'functional' state machines, which allow for providing different parameters or actions corresponding to different states therein. Use of state machines for controlling the security device 200, and/or its functions or operations, is described in more details in one or more of the following figures, particularly with respect to FIGS. 3A and 3B.

The encryption engine 230 may comprise suitable logic, circuitry, interfaces, and/or code that may be operable to perform encryption or decryption operations in the security device 200, in accordance with one or more supported encryption protocols or algorithms, including asymmetric public key based algorithms (e.g., RSA), and/or symmetric private key based algorithms (e.g., AES).

The positioning engine 240 may comprise suitable logic, circuitry, interfaces, and/or code that may be operable to determine and/or obtain position related information. In this regard, the position engine 240 may be configured to determine the location of the security device 200, based on one or more positioning methods, such as Global Navigation Satellite System (GNSS), like GPS, GLONASS, Galileo or Beidou systems, or based on WiFi or cellular positioning or tracking.

In operation, the security device 200 may support use of security measures in electronic devices. In this regard, the security device 200 may be operable to provide such security measures as authentication (of devices, users, or activities), and/or to perform data encryption and/or decryption, in accordance with one or more support encryption algorithms, on data communicated to and/or from the electronic device using the security device 200. For example, the security device 200 may be operable to support data encryption and/or decryption based on the RSA algorithm. In this regard, in instances where RSA based encryption/decryption is being utilized, the security device 200 may generate and/or provide private keys that enable decryption of received encrypted messages.

In an embodiment of the invention, the security device 200 may be utilized selectively and/or dynamically, such that the security device 200 does not have to run continuously. In this regard, the selective and/or dynamic operation of the security device 200 may reflect the non-constant use of encryption/decryption by the electronic device comprising or coupled to the security device 200. In other words, the selective use of the security device 200 may enable deactivating it when the electronic device does not require and/or is not utilizing security operations (i.e., not authentication, encryption, or decryption is needed). In this regard, the security device 200 may be activated only when it is determined that its use is needed. The security device 200 may be configured to concurrently and independently handle a plurality of concurrent secure communications.

In an embodiment of the invention, the electronic device using the security device 200 may at the same time securely communicate with multiple devices (e.g., a remote peer device and a secure website). In this regard, communications may be secured in accordance with the RSA algorithm, whereby the security device 200 may be utilized to generate private keys used in encrypting and/or decrypting communicated data. Accordingly, the security device 200 may be operable to concurrently generate two different private keys, one for decrypting encrypted data received from the remote peer device and the other for decrypting encrypted data received from the secure website. Furthermore, the operations of the security device 200 that are performed to support the communication sessions with each of the remote peer device and the secure website may be performed independently and securely, such that any information associated with either one of the two communication sessions is maintained hidden from the other communication session. For example, the security device 200 may be configured such that private key(s) generated to support a particular secure communication (e.g., in communicating with the remote peer device) is hidden from and not accessible during other secure communications supported by the security device (e.g., during communication with the secure website).

Figure 2B:
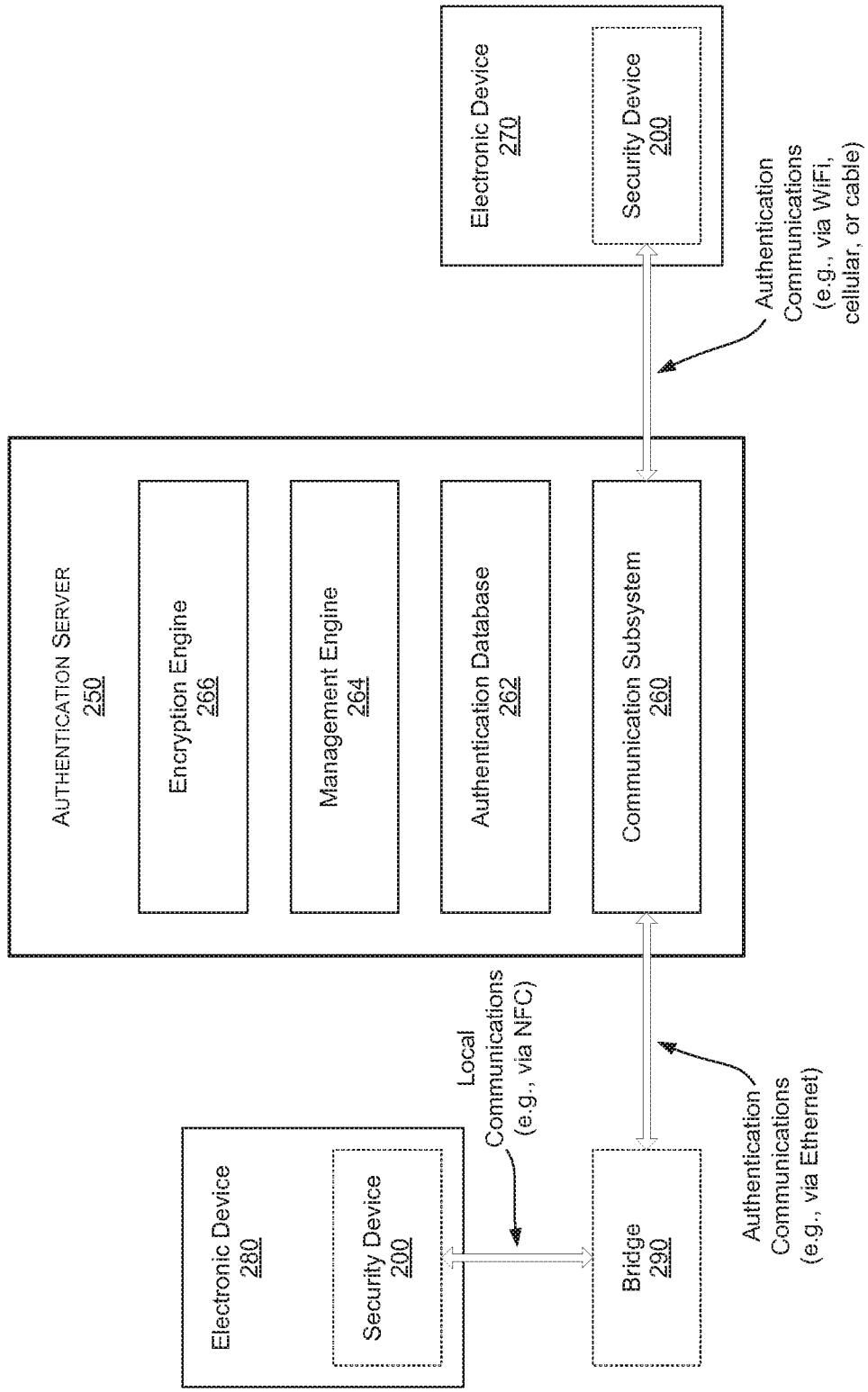
FIG. 2B is a block diagram illustrating an exemplary authentication server, in accordance with an embodiment of the invention.

FIG. 2B is a block diagram illustrating an exemplary authentication server, in accordance with an embodiment of the invention. Referring to FIG. 2B, there is shown an authentication server 250, electronic devices 270 and 280, each of which having an instance of the security device 200, and a bridge unit 290 that may be used in conjunction with electronic device 280.

The authentication server 250 may comprise suitable logic, circuitry, interfaces, and/or code for providing centralized support of security operations, such as by enabling authenticating security devices, tokens, or tags, which may be used in providing and/or supporting security functions in electronic devices. The authentication server 250 may comprise a communication subsystem 260, an authentication database 262, a management engine 264, and an encryption engine 266.

The communication subsystem 260 may be similar to the communication subsystem 210 of the security device 200, substantially as described with respect to FIG. 2A. In this regard, the communication subsystem 260 may comprise suitable circuitry, interfaces, logic, and/or code operable to communicate data from and/or to the authentication server 250, such as via one or more wired and/or wireless connections in accordance with one or more supported wired or wireless protocols or standards.

The authentication database 262 may comprise suitable logic, circuitry, interfaces, and/or code for maintaining and/or controlling use of a database that may be used in authentication of devices, users, and/or operations. In this regard, the authentication database 262 may be used to store expected values of particular security parameters which may be provided and/or reported by devices seeking authentication. In an embodiment of the invention, the authentication database 262 may maintain for each supported security device 200 one or more reference expected transition patterns/mappings.

The management engine 264 may comprise suitable logic, circuitry, interfaces, and/or code for controlling authentication operations, and/or modifying authentication related parameters or functions. For example, the management engine 264 may be configured to develop new authentication transition patterns/mappings, and reconfigure existing transition patterns/mappings associated with supported security devices.

The encryption engine 266 may be similar to the encryption engine 230 of the security device 200, substantially as described with respect to FIG. 2A. In this regard, the encryption engine 266 may comprise suitable circuitry, interfaces, logic, and/or code for performing and/or supporting encryption or decryption related operations, in accordance with one or more supported encryption protocols or algorithms, including asymmetric public key based algorithms (e.g., RSA), and/or symmetric private key based algorithms (e.g., AES).

With respect to the electronic device 270, which may correspond to an integrated networked electronic device with wired or wireless networking capabilities, and having its own power supply, the security device 200 is attached to the electronic device 270 or may be a component of the electronic device 270. In this regard, the security device 200 of the electronic device 270 may be used to authenticate the electronic device and/or the user of the electronic device. In this scenario the integrated device's network connection is used to directly network the security device 200 to the authentication server 250, and the internal power supply of the electronic device 270 may be used to provide any power required for functions or operations of the security device 200. Exemplary integrated networked electronic devices may comprise personal computers, laptop computers, tablet computers, mobile phones, personal digital assistants, personal media players, gaming devices, image and/or video cameras, for example.

In operation, the authentication server 250 may be utilized to enable authentication of security devices, which in turn may ensure secure use of electronic device and/or communications thereby. As shown in FIG. 2B, there may be different usage scenarios for security devices and their interfacing to the authentication server 250. In this regard, the authentication server 250 server may reside inside an organization's Intranet, or it may reside on a public network such as the Internet. The communication channels used for authentication related communications between the security device(s) 200 and the authentication server 250 may use wired or wireless channels. For example, the communication channel may be a wired local area network connection, such as using Ethernet based connectivity, or it may be a wireless channel such as using Bluetooth, ZigBee, Wi-Fi (IEEE 802.11 network), cellular (e.g., CDMA, TDMA, GSM), or any other wireless network, and/or any combination thereof.

The electronic device containing the security device may incorporate an internal power supply (e.g., the electronic device 270), or it may lack an internal power supply (e.g., the electronic device 280, which may comprise a battery-less credit card). In this regard, use of the electronic device 280, and/or authentication operations via the security device 200 contained thereby, may require use of the bridge unit 290 (e.g., card reader) which may be used to link the security device 200 to the authentication server 250. The bridge unit 290 may use short-range wireless communication methods such as Near Field Communication (NFC), Radio Frequency Identification (RFID), or Bluetooth to communicate with the security device 200. The bridge unit 290 may communicate with the authentication server 250 using a wired connection (e.g. an Ethernet connection), or longer-range wireless methods (e.g. WiFi or cellular). In instances where a bridge device (e.g., the bridge unit 290) is being utilized to facilitate authentication exchanges between the security device 200 and the authentication sever 250, various encryption methods may be used to prevent the bridging unit 290 (or other unauthorized devices) from accessing or decoding the exchanged data.

In the case of the battery-less mode of operation, the security device 200 may receive its power during the authentication process from another source (through a wired or wireless based charging or power supply). In this regard, the wireless/wired charging is synchronized to the authentication requests. The authentication server 250 may provide wireless charging to the security device 200 in advance of any operation. For example, before reconfiguring the ROM content inside the security device 200, the server may trigger wireless charging to the security device 200 to enable programming of the ROM. In some instances, before requesting a state transition, the authentication server 250 could trigger wireless charging to the security device 200 so that it may step through its states and report the following state back to the authentication server 250.

In an embodiment of the invention, the authentication server 250 may disable and/or deactivate the security device 200, such as permanently or for a period of time. In this regard, the authentication server 250 may configure the security device 200 so that it may not engage in any authentication process. In some instances, the authentication server 250 may subsequently reactivate the security device 200. In such usage scenario the security device 200 may comprise an activation/deactivation component (e.g., hardware based logic), which may be configured by the authentication server 250. When the activation/deactivation component is programmed and set to the "disable" value, the security device 200 cannot engage in any authentication process. Once the activation/deactivation component is programmed and set to the "active" value, the security device 200 may go back to the normal mode of operation.

In some embodiments of the invention, messages or data exchanged between the security device 200 and authentication server 250 may be encrypted. In this regard, different encryption protocols or methods may be used. For example, the security device 200 may be configured to use a public key associated with the authentication server 250 (e.g., the public key published by particular credit card issuer, online store, etc.) to initiate the link and send the first messages to the authentication server 250. In this phase of communication, the encryption key publicly associated with the authentication server 250 may be used by the security device 200 to encrypt the messages intended for the authentication server 250. Since the decryption key matching that public key is only known to the authentication server 250, the messages sent by the security device 200 may only be decrypted by the authentication server 250. One limitation with the public key method is that it only provides security for the messages from the security device 200 to the authentication server 250. Therefore, in an embodiment of the invention, private key based methods may be utilized. In this regard, during the initiation phase, the security device 200 may select a random private key and communicates that random private key to the authentication server 250 using the public key encryption. After the private key is exchanged, both the authentication server 250 and the security device 200 may switch to a private session in which both sides may use the private key in encrypting/decrypting exchanged messages (in both directions). In other words, after exchanging the private key using communication encrypted using the public key, the private key may then be used for all the subsequent exchanges between the authentication server 250 and the security device 200. Accordingly, the first phase (using the public key) may provide asymmetric security (i.e., only messages from the security device 200 to the authentication server 250 may be protected) while the second phase (using the private key) may provide symmetric security (i.e., messages from both the authentication server 250 and the security device 200 are protected).

In an embodiment of the invention, the security device 200 may be configured to also authenticate the identity of a requesting server before exchanging any data with it. This is to protect the security device 200 from exchanging data with a falsely pretending server. In this case, the security device 200 may have some internal data sequence that is used for server authentication (reverse authentication). The internal data may be hardwired inside the security device 200 or it may be updated and/or programmed at the end of each transaction. The reverse authentication may entail the security device 200 asking the requesting server (e.g., the authentication server 250) to provide some elements of that internal data sequence correctly as a means of authenticating the server. For example, the internal data sequence may contain 1000 bits, and the security device 200 may ask the server to provide the bits at particular locations in the sequence (e.g., at locations {1, 5, 10, 15, 44, and 100}). If the six bits provided by the server match correctly, the server is authenticated and data exchanges may be initiated thereafter.

In an embodiment of the invention, an additional security check may be performed and/or mandated by the security device 200, when the server (e.g., the authentication server 250) attempts to reconfigure the settings of the security device 200, whereby security check(s) may have to be performed (and passed) before the security device accepts the changes submitted by the server. This is to ensure that even if the "public key encryption" is broken and/or hacked (and hence the private key session may be jeopardized), the hacking server cannot change the settings of the security device 200. Thus, a hacking server cannot disable and/or destroy the security device 200 by overriding its settings. This additional level of security may be implemented by asking the authentication server 250 to submit both the current and new settings to the security device 200. The security device 200 may first check the current setting in the server's message and compare it with its actual current settings. The security device 200 would only accept and apply the new settings if these two match. A hacking server that does not know the current settings of the security device 200 therefore cannot instruct the security device 200 to change any settings.

In an embodiment of the invention, the security device 200 may be used by the authentication server 250 to authenticate a device in order to authorize an online transaction performed through the device. The authentication server 250 may send a temporary/virtual authorization number to the authenticated device. The temporary number can then be used by a user to make a transaction through a website (e.g. the user enters the number manually on a graphical user interface input field, or the number is automatically transferred using a wireless method). The temporary number expires after a short time.

Figure 3A:
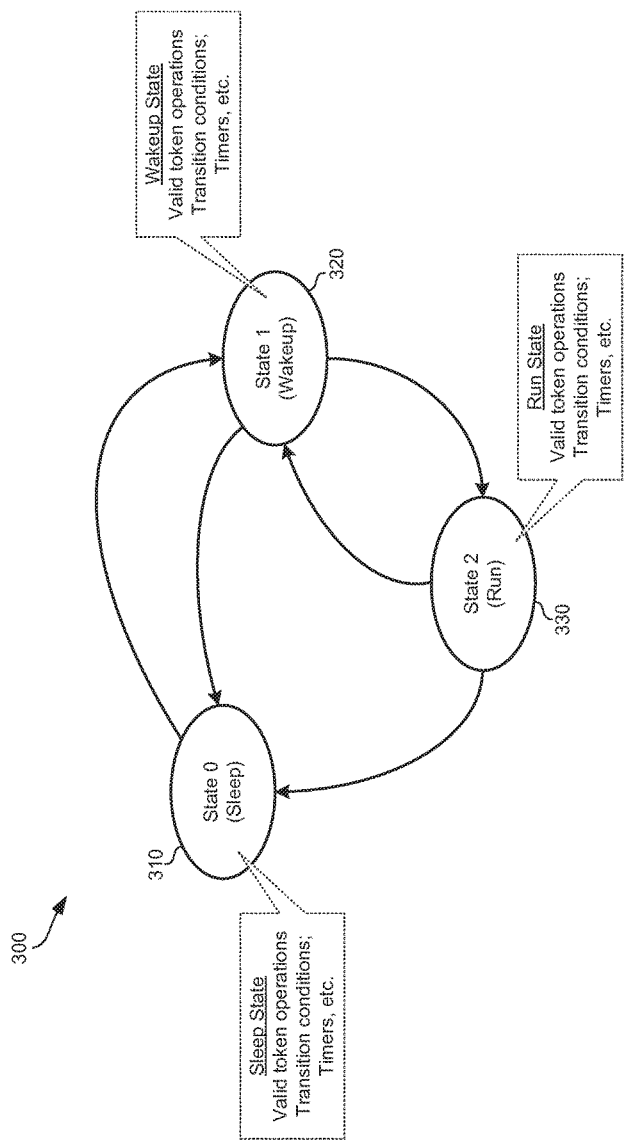
FIG. 3A is a block diagram illustrating an exemplary state machine for use in controlling dynamic security devices, in accordance with an embodiment of the invention.

FIG. 3A is a block diagram illustrating an exemplary state machine for use in controlling dynamic security devices, in accordance with an embodiment of the invention. Referring to FIG. 3A, there is shown an exemplary activation state machine 300, which may be utilized for controlling a security device, such as the security device 200 of FIG. 2.

The activation state machine 300 may comprise a plurality of states, each of which may be operable to differently and/or variably configure a security device such as the security device 200 and/or control its operations. For example, the activation state machine 300 may comprise a State_0 310, a State_1 320, and a State_2 330. Each of the states State_0 310, State_1 320, and State_2 330 may define a different function or operating state for the security device associated with the activation state machine 300. In an exemplary embodiment of the invention, the State_0 310 may correspond to a sleep state, the State_1 320 may correspond to a wakeup state, and the State_2 330 may correspond to a run state. In this regard, the sleep state. State_0 310, may represent a state in which the security device may be completely disabled and/or turned off. This may be similar to a power off state. The run state, State_2 330, may represent a state in which the security device may be fully functional. In other words, when operating in the run state, State_2 330, the security device may provide and/or generate information required to enable or facilitate security operations associated with the security device. The wakeup state, State_1 320, may represent an intermediate state, which may be between the sleep state (State_0) 310 and the run state (State_2) 330—i.e., between full functionality and power off. For example, in the wakeup state (State_1) 320 the security device may not be fully functional but is nonetheless powered on, and is ready and/or available for prompt transition to the run state. In this regard, transitioning from the wakeup state, State_1 320, to the run state, State_2 330 may only entail activating functions pertaining to the generation and/or outputting of security information (e.g., RSA private keys).

In an embodiment of the invention, the states of the activation state machine 300 may be configured and/or setup such as to represent varying power consumption profiles. For example, power consumption associated with the sleep state (State_0) 310 may be smaller than that of the wakeup state (State_1) 320, which in turn is associated with power consumption that is smaller than the power consumption associated with the run state (State_2) 330. In this regard, the power consumption, and/or any changes therein, may be based on power use resulting from and/or relating to operations of the security device 200 itself, and/or any other resources that may be used in conjunction with use of the security device 200 during security operations—such as processing and/or storage resources (of the electronic device utilizing the security device 200) that are utilized during data encryption and/or decryption. Therefore, the use of the state machines for controlling and/or managing operations of security devices may be incorporated into and/or be part of power management operations in the electronic device associated with the security device 200.

In an embodiment of the invention, the activation state machine 300 may be predetermined or dynamically determined, and/or preconfigured or dynamically configured. In this regard, configuring and/or determining the activation state machine 300 may comprise defining and/or specifying various parameters and/or information applicable to the state machine and/or to the corresponding security device. The configuration and/or determined per-state parameters and/or information may comprise, for example, specifying for each particular state valid token operations and/or functions for the security device associated with the activation state machine 300, state transition related information—i.e., information regarding transitions from and/or to the particular state; and/or timing information. The transition information for each state may specify which other states are valid for transitioning to and/or from the current state. The timing information may specify running duration and/or timeout values before triggering state transitions. For example, the per-state information may be preconfigured to instruct the associated security device to wake up and run for some predetermine time (e.g., x cycles), then enter the sleep mode, and remain there for predetermine time (e.g., y cycles), then wake up and then run for certain time (e.g., z cycles) before entering the sleep mode again.

In an embodiment of the invention, a plurality of different state machines, or a plurality of instances of the state machine, each substantially similar to the activation state machine 300, may be utilized in conjunction with a single security device, such as the security device 200. In this regard, each of the plurality of state machines or instances of the state machine may be operable to handle a corresponding secure communication with a particular remote peer or secure website. Accordingly, the plurality of different state machines or instances of the state machine may be utilized to enable the corresponding security device to handle concurrently and independently a plurality of concurrent secure communications, such as concurrent communications with peer remote devices and/or multiple access applications of secure website locations. In this manner, the security device may operate in a mutually exclusive manner, using the different state machines or instances of the state machine, to enable concurrent use of the security device to support these secure communications while at the same time, ensuring that security information utilized for particular remote peer or secure website (e.g., RSA private key) is hidden from another remote peer or secure website.

The selection of an applicable state machine to handle a particular secure communication session may be based on one of plurality of security profiles that may be maintained by the electronic device. In this regard, each of the security profiles may be mapped to a corresponding state machine applicable to the security device. In accordance with an embodiment of the invention, each of plurality of security profiles may be associated with a particular service provider, a device vendor, and/or a website. The plurality of security profiles may be predetermined, dynamically determined, and/or programmed into the electronic device. For example, in instances where a security device, for example, the security device 200, may be utilized to secure communication with a plurality of secure websites, a plurality of security profiles may be configured, each of which may correspond with a particular secure website. In this regard, each of the security profiles may specify various information and/or criteria that may be utilized to perform secure communication with the corresponding secure website. The information may comprise, for example, applicable encryption schemes and/or related information relevant thereto, and/or may also comprise applicable state machine information that may be utilized to control and/or manage operations of the security device in conjunction with providing secure communication sessions when accessing that website.

Figure 3B:
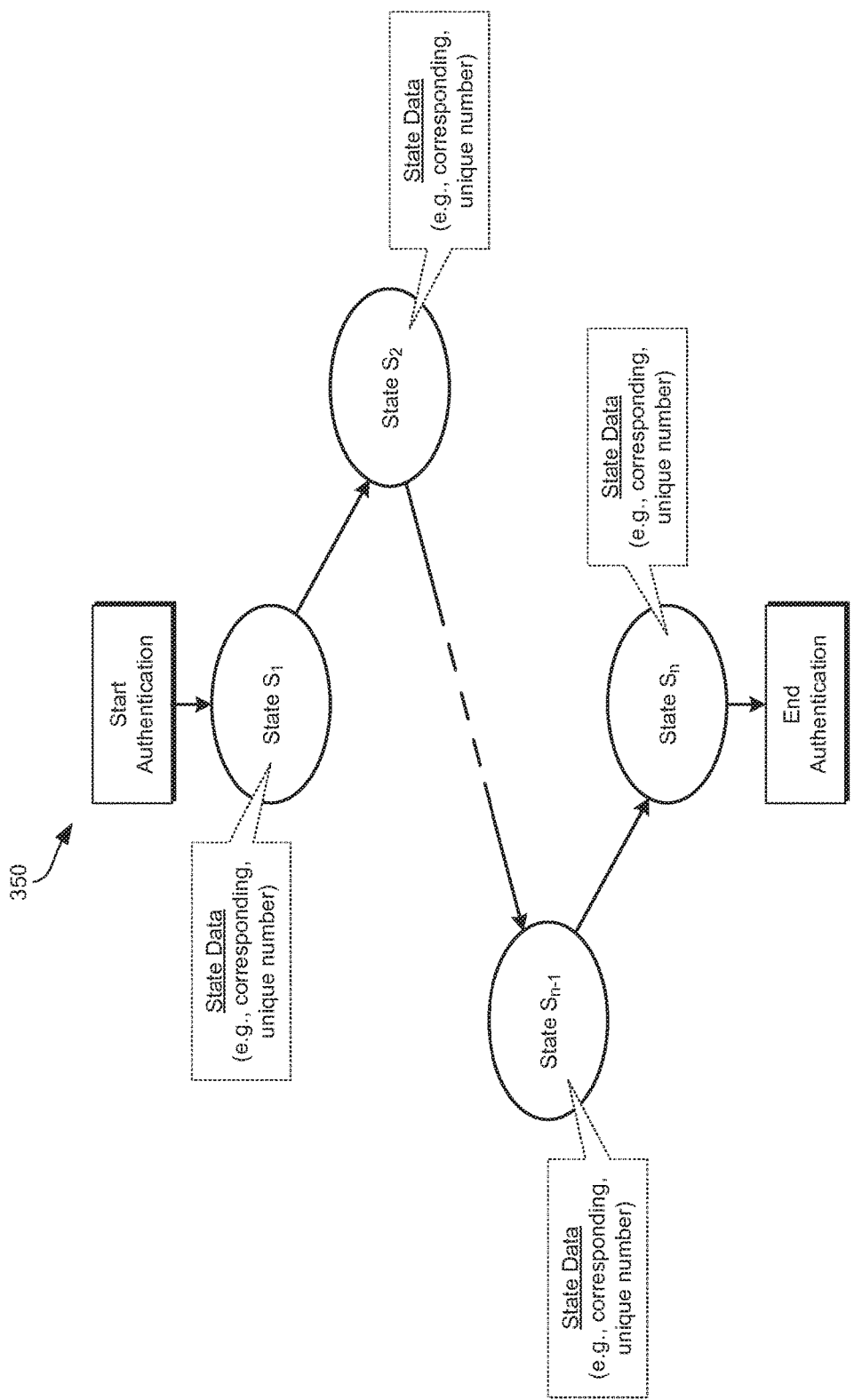
FIG. 3B is a block diagram illustrating an exemplary authentication state machine for use by security devices, in accordance with an embodiment of the invention.

FIG. 3B is a block diagram illustrating an exemplary authentication state machine for use by security device, in accordance with an embodiment of the invention. Referring to FIG. 3B, there is shown an exemplary authentication activation state machine 300, which may be utilized for authenticating a security device, such as security device 200 of FIG. 2. In this regard, while both FIG. 3A and FIG. 3B describe state machines, these state machines pertain to and/or used in conjunction with different functions. Specifically, FIG. 3A depicts an overall operation/activation state machine—e.g., controlling when and/or which security devices or security operations may be used; whereas FIG. 3B depicts a security-engine/authentication state machine—e.g., controlling how security operations may be performed.

The state machine 350 may comprise a plurality of states, each of which may be operable to provide a unique value. For example, the state machine 350 may comprise states $S_1$-$S_n$. In this regard, each state ($S_i$) may be represented by a sequence of bits, and/or may have associated with it a corresponding state data that may comprise one or more parameters, which may include at least one unique value. Thus, the state machine 350 may be used in generating a sequence of unique values, such as by traversal of the state machine—e.g., performing state transitions from one state to another by different trigger mechanisms—and extracting the unique value(s) associated with each accessed state. The mapping of state transitions may be hardwired or programmable. For example, a security device may be programmed to transition from $S_1$ to $S_2$ when a 1st READ request is received (and the 2nd READ may result in a transition from $S_2$ to $S_3$ depending on the programming stored in its RAM), whereas another security device may be programmed to transition from $S_{n-1}$ to $S_n$ when a 1st READ request is received (and the 2nd READ may result in a transition from $S_n$ to $S_{n+1}$ depending on the programming stored in its RAM). Thus, a sequence of READ requests by the server results in a unique sequence of states for each security device. The mapping of state transitions may be hardwired inside the security devices and the mapping itself may uniquely authenticate the identity of the security device. In another implementation, the mapping of state transitions may be configured through a storage element (e.g., a RAM), with the content of the storage element being configurable in some instances by the authentication server. For example, the authentication server may change the states mapping at the end of each successful authentication.

In some embodiment, the security device 200 may be configured (e.g., by the authentication server 250) to traverse the state machine 350 in particular manner while generating responses to the authentication server 250 as part of an authentication procedure. For example, the security device 200 may be configured to traverse the state machine 350 in single state increments, with each state ($S_i$) being traversed at least once during the generation of the sequence of responses. In other instances, however, states may be traversed in other manner beside in single state increments, and/or without having to traverse each state in the state machine 350. For example, in some embodiments, the trajectory of state transitions may be configured using single state increments, variable number(s) of state increments, and/or any combination(s) thereof (e.g., in accordance with particular path programmed by the authentication server 250). Furthermore, the trajectory of state transitions may be configured such that only a subset of the states in the state machine 350 may be traversed (e.g., with the selected states being traversed once or more) during the generation of the sequence of responses.

In a typical usage scenario, the authentication server 250 may instruct the security device 200 to report its states for a number of transitions (e.g. 10 back-to-back state transitions). The security device 200 may then report the corresponding states (e.g., values or parameters of corresponding states for 10 transitions). The authentication server 250 may compare the reported transitioned states against a reference expected pattern (e.g., retrieved or derived from the authentication database 262, or from another storage location that the authentication server may access) associated with the security device 200. The authentication server 250 may then use the results of the comparison to accept or reject the authentication of the security device 200 (and thus of any operations being performed via the electronic device containing the security device). The number of transitions instructed by the authentication server 250 may be configurable, such as by the authenticating server. At the beginning of each authentication or some authentications the authentication server 250 may initialize the security device 200 to a known or a programmable state (e.g., particular state $S_i$ of the state machine 350), before requesting the state transitions. Alternatively, the authentication server 250 may instruct the security device 200 to start or resume from the last state of the previous authentication performed therein.

In an embodiment of the invention, at the end of each authentication or some authentications the authentication server 250 may change authentication related configuration and/or parameters in the security device 200. For example, the content of the RAM inside the security device 200 or the mappings of state transitions may be changed by the authentication server 250 for future authentications. Thus, the next authentication may be validated using a different pattern or mapping. For example, the management engine 264 within the authentication server 250 may produce new state patterns or mappings, and the authentication sever 250 may then reconfigure the patterns/mappings inside the security device 200 (e.g., updating the internal storage devices inside the security device 200 comprising the authentication related data), and update the authentication database 262 accordingly (e.g., updating the "reference expected transition pattern" corresponding to the security device 200 accordingly).

In an embodiment of the invention, at the conclusion of an authentication of a transaction, the authentication server 250 may store data relating to the transaction (time, date, amount, store, etc.), such as inside the security device 200 (e.g., in the memory 204). The stored data may be archived and/or used for various purposes, such as tracking, dispute management, data mining, reward systems, and/or targeted advertising. Additionally, when the location of the security device is available (e.g., obtained via the positioning subsystem 240) location information (e.g., coordinates) at the time of authentication may also be stored as part of the transaction data. In some instances, such transaction related data or logs that are stored on the security device 200, by the authentication server 250, may be used for future authentications. For example, as part of authentication process, the authentication server 250 may request that the security device 200 report particular transaction data relating to a number of previous transactions (dates, amounts, etc.) which the authentication server 250 knows must have been stored on the security device 200.

Figure 4A:
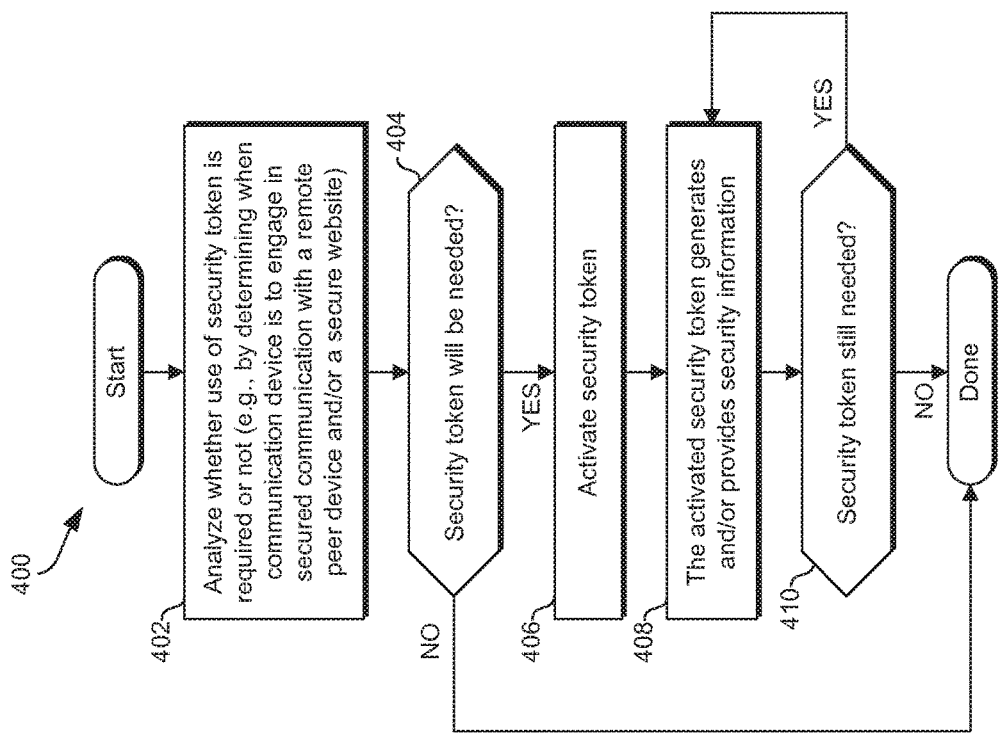
FIG. 4A is a flow chart that illustrates exemplary steps for selectively using security devices, in accordance with an embodiment of the invention.

FIG. 4A is a flow chart that illustrates exemplary steps for selectively using security devices, in accordance with an embodiment of the invention. Referring to FIG. 4A, there is shown a flow chart 400 comprising a plurality of exemplary steps for selectively activating a security device, such as security device 200.

In step 402, an analysis of whether or not the security device should be utilized may be done. This may comprise, for example, of determining whether or not an electronic device that comprises or is coupled to the security device, utilizing that security device for providing or supporting security functions, may be engaged in secured communication with another device and/or with a secure website. In step 404, it may be determined whether the security device is needed, based on the analysis performed in step 402. In instances where the security device is not needed, the process may terminate.

Returning to step 404, in instances where the security device is needed, the process may proceed to step 406. In step 406, the security device may be activated. In this regard, activation of the security devices may be performed and/or controlled by the corresponding state machine, such as the activation state machine 300 of FIG. 3A and the security-engine/authentication state machine 350 of FIG. 3B. For example, activating the security device 200 may comprise transitioning to the run state (State_2) 330, from the sleep state (State_0) 310 or the wakeup state (State_1) 320. In step 408, once the security device is activated, it may be utilized to provide security functions (e.g., authentication, and/or to generate and/or provide security information required for enabling or facilitating security operations). For example, the security device 200 may respond to authentication requests from authentication server 250, or it may generate and/or output RSA private keys to enable data decryption in accordance with the RSA algorithm. In step 410, it may be determined whether the security device is still needed. This may be achieved by determining if the security device 200 is still engaged in secure communication session. The determination may also be based on information associated with the applicable state machine. For example, the determination may be based on one or more timers that may be associated with the run state (State_2) 330. The expiration of this timer may trigger transitions from the run state (State_2) 330. In instances where the security device is no longer needed, the process may terminate. Otherwise, the process may return to step 408, where use of the security device continues in order to support security operations.

Figure 4B:
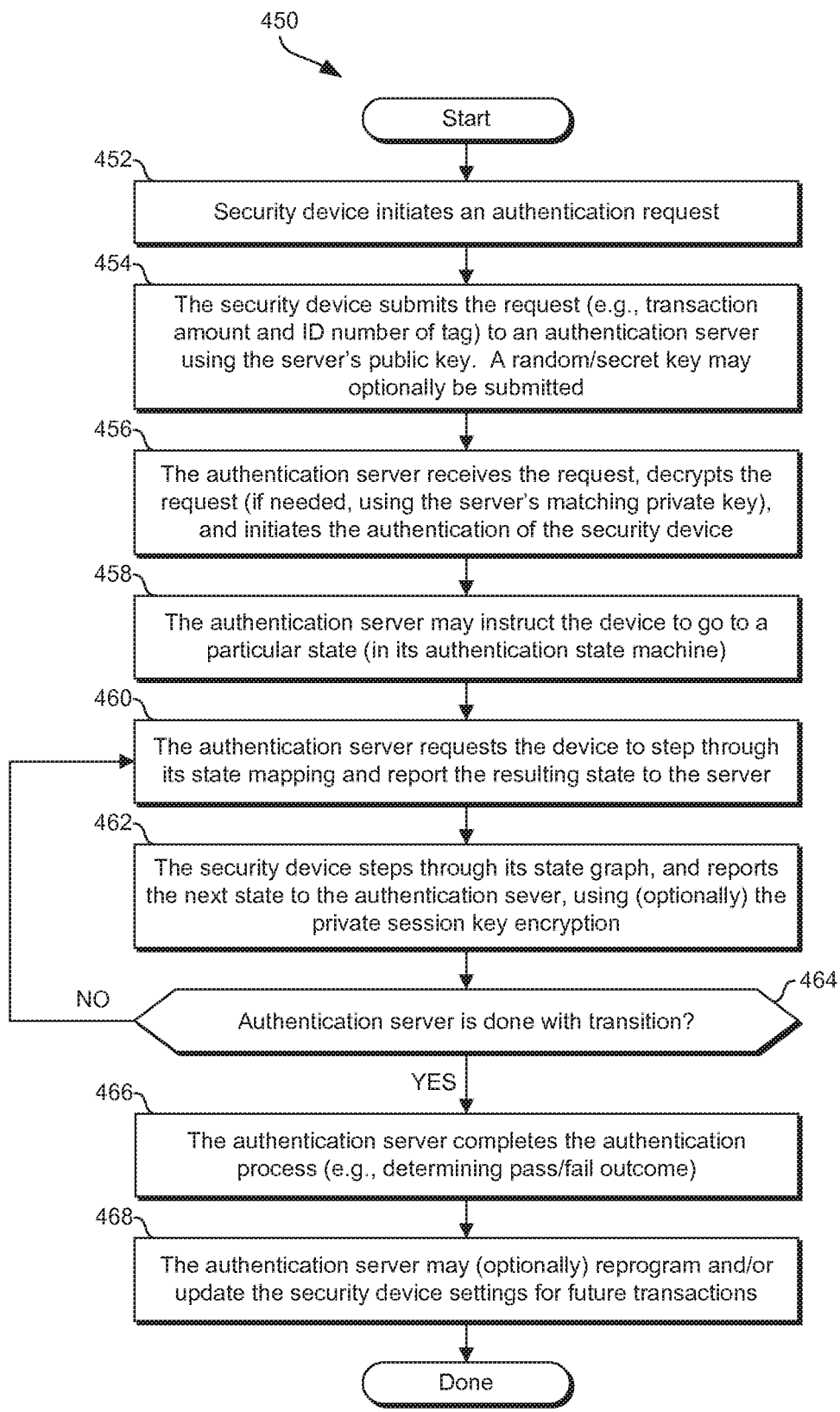
FIG. 4B is a flow chart that illustrates exemplary steps for performing authentication by use of security devices, in accordance with an embodiment of the invention.

FIG. 4B is a flow chart that illustrates exemplary steps for performing authentication by use of security devices, in accordance with an embodiment of the invention. Referring to FIG. 4B, there is shown a flow chart 450 comprising a plurality of exemplary steps for performing authentication process between authentication server, such as the authentication server 250, and a security device in an electronic device, such as in the security device 200. In this regard, as shown in FIG. 4B, the authentication process may comprise use of encryption to protect the messages exchanged between the security device and the authentication server. In some instances, however, the encryption phase may be omitted.

In step 452, the security device may initiate the authentication process, such as by initiating an authentication request that may be communicated to the authentication server. In step 454, the security device may submit the authentication request to the authentication server. The authentication request may comprise of, for example, identification information, such as identifier (ID) of the security device tag and other relevant information. For example, the other relevant information of an authentication request for a financial transaction may comprise a transaction amount. In some embodiments of the invention, the authentication request may comprise a random private session key, which may optionally be submitted by the security device, where the authentication server can use this session key to encrypt its messages to the security device. In some instances, before a private session is established, the security device may encrypt its request with a public key associated with the authentication server before sending the authentication request to the authentication server.

In step 456, the authentication server may receive the authentication request, may decrypt the authentication request (using the matching key only known to the authentication server), and initiate the authentication of the security device. In instances where a private random key is exchanged between the authentication server and the security device, all communications may subsequently be encrypted using that private key. In step 458, the authentication server may instruct the security device to go to a particular state in its authentication state machine (350). For example, in some embodiments of the inventions, the authentication server may instruct the security device to go to a state $S_i$, or to the last state from a previous transaction. In other embodiments of the inventions, however, the security device may always start from the same initial state (e.g., $S_1$) at the beginning of each authentication request. In step 460, the authentication server may instruct the security device to step through its authentication state machine by one (i.e., to the next state), and reporting for each state the corresponding values to the authentication server. In this regard, this instruction—that is to step through the authentication state machine—may be submitted by the authentication server to the security device using the private key. In some instances, the mapping of state transitions may be stored in the memory (e.g., RAM) of the security device and the mapping may be configured by the server. For example, based on the mapping stored in the RAM, the device may transition from $S_1$ to $S_7$ by the 1st READ and from $S_7$ to $S_5$ by the 2nd READ, etc. In step 462, the security device may receive the encrypted request, decrypt the authentication request, step through its authentication state machine, and report the next state (after encrypting it using the private key) to the authentication server.

In step 464, the authentication server may determine if it has completed its transition requests to the security device. In this regard, the determination of whether the transition is complete may be based on determination whether the number of states traversed in the authentication state machine is the expected number (e.g., total number of states in the authentication state machine, or a multiple thereof). In instances where it may be determined that the transition is not complete, the process may loop back to step 460, whereby the authentication server may request the security device to step through its authentication state machine, by a configuration that is stored in the device RAM.

In instances where it may be determined that the transition is complete, the process may move to step 466. In step 466, the authentication server may complete the authentication. In this regard, the authentication server may compare the responses of the security device with the expected responses, and may complete the authentication process with a pass/reject outcome determination based on that comparison (e.g., determining a 'pass' outcome only if all responses match). In step 468, the authentication server may optionally reprogram or update the security device settings (authentication state machine and RAM), and may correspondingly update the database of "Reference Expected Transition Patterns" for future authentications.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for state machine security device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed; but that the present invention will include all embodiments falling within the scope of the appended claims.

What is claimed is:

1. A non-transitory computer readable medium storing a program for authenticating a transaction or access via a security device, the program executable by a processing unit, the program comprising sets of instructions for:
communicating an authentication request by the security device to an authentication server;
for a sequence of information requests comprising a plurality of information requests:
receiving an information request in the plurality of information requests at the security device from the authentication server;
sending, in response to the received information request, a response from the security device to the authentication server, the response comprising a value generated based on a current state in a plurality of states of an internal authentication state machine in the security device; and
repeating said receiving and said sending for each information request in the plurality of information requests to traverse the authentication state machine until sending a response to a last information request in the sequence of information requests, wherein the values sent to the authentication server comprise a sequence of reported values,
wherein the security device is authenticated by the authentication server based on comparing of the sequence of reported values with a sequence of expected values used by the authentication server in uniquely identifying the security device.

2. The non-transitory computer readable medium of claim 1, the program further comprising a set of instructions for generating each reported value in the sequence of reported values from a particular state in the internal authentication state machine during the generation of the sequence of reported values.

3. The non-transitory computer readable medium of claim 1, the program further comprising a set of instructions for configuring the security device to traverse the internal authentication state machine.

4. The non-transitory computer readable medium of claim 3, the program further comprising a set of instructions for configuring the security device to traverse the internal authentication state machine in single state increments or variable number of state increments.

5. The non-transitory computer readable medium of claim 1, wherein the security device is initialized by the authentication server, at the beginning of each authentication or some authentication to a particular state of the internal authentication state machine.

6. The non-transitory computer readable medium of claim 1, wherein one or both of the security device and the authentication server configures a state mapping used in generating the sequence of reported values based on the internal authentication state machine.

7. The non-transitory computer readable medium of claim 6, wherein one or more of a number of states in the internal authentication state machine, a value associated with each state in the internal authentication state machine, and a starting state in the internal authentication state machine are set or adjusted when setting the state mapping.

8. The non-transitory computer readable medium of claim 1, wherein the authentication server reconfigures, at the end of each authentication or some authentications, the generation of the reported values by the security device and the sequence of expected values such that a subsequent authentication is validated by a different state mapping.

9. The non-transitory computer readable medium of claim 8, wherein reconfiguring the generation of the reported values comprises at least one of changing a number of states in the internal authentication state machine, changing a value associated with each state in the internal authentication state machine, and a starting state in the internal authentication state machine.

10. The non-transitory computer readable medium of claim 1, the program further comprising a set of instructions for encrypting messages communicated between the security device and the authentication server during the authentication of the security device.

11. The non-transitory computer readable medium of claim 10, the program further comprising a set of instructions for selecting by the security device, for the encryption of messages, a random private key associated with the security device, and communicating the selected random private key to the authentication server using public key encryption, the security device and the authentication device being configured to switch to use the selected random private key after an exchange of the random private key.

12. The non-transitory computer readable medium of claim 1, the program further comprising a set of instructions for authenticating by the security device, identity of the authentication server before sending said values to the authentication server, the authentication comprising requesting the authentication server to provide validation data for comparison with local data maintained by the security device.

13. The non-transitory computer readable medium of claim 1, the program further comprising a set of instructions for selectively activating and deactivating the security device based on an activation state machine associated with the security device.

14. The non-transitory computer readable medium of claim 1, the program further comprising a set of instructions for concurrently utilizing the security device for supporting multiple authentication sessions, the concurrent use comprising performing, independently and/or concurrently, multiple authentications of the security device with one or more authentication servers.

15. A system, comprising:
an authentication server; and
a security device comprising one or more circuits, the one or more circuits configured to:
communicate an authentication request to an authentication server;
for a sequence of information requests comprising a plurality of information requests:
receive an information request in the plurality of information requests from the authentication server;
send, in response to the received information request, a response in a sequence of responses from the security device to the authentication server, the response comprising a value generated based on a current state in a plurality of states of an internal authentication state machine in the security device; and
repeat said receiving and said sending for each information request in the plurality of information requests to traverse the authentication state machine until sending a response to a last information request in the sequence of information requests, wherein the values sent to the authentication server comprise a sequence of reported values, wherein the security device is authenticated by the authentication server based on comparison in the authentication server of the sequence of reported values with a sequence of expected values used by the authentication server in uniquely identifying the security device.

16. The system of claim 15, wherein the one or more circuits are further configured to generate each reported value in each of the sequence of responses from a particular state in the internal authentication state machine during a generation of the sequence of responses.

17. The system of claim 15, wherein the one or more circuits are further configured to set the sequence of reported values in the sequence of responses based on traversal of the internal authentication state machine.

18. The system of claim 17, wherein the security device is configured to traverse the internal authentication state machine in single state increments and variable number of state increments.

19. The system of claim 15, wherein the one or more circuits are further configured to encrypt or decrypt messages communicated between the security device and the authentication server during the authentication of the security device.

20. The system of claim 15, wherein the one or more circuits are further configured to authenticate, an identity of the authentication server before sending said values to the authentication server, the authentication comprising requesting the authentication server to provide validation data for comparison with local data maintained by the security device.

* * * * *